July 3, 1923.
A. L. NORRIS.
ROTARY BRUSH
Filed May 9, 1921
1,460,765
2 Sheets-Sheet 1
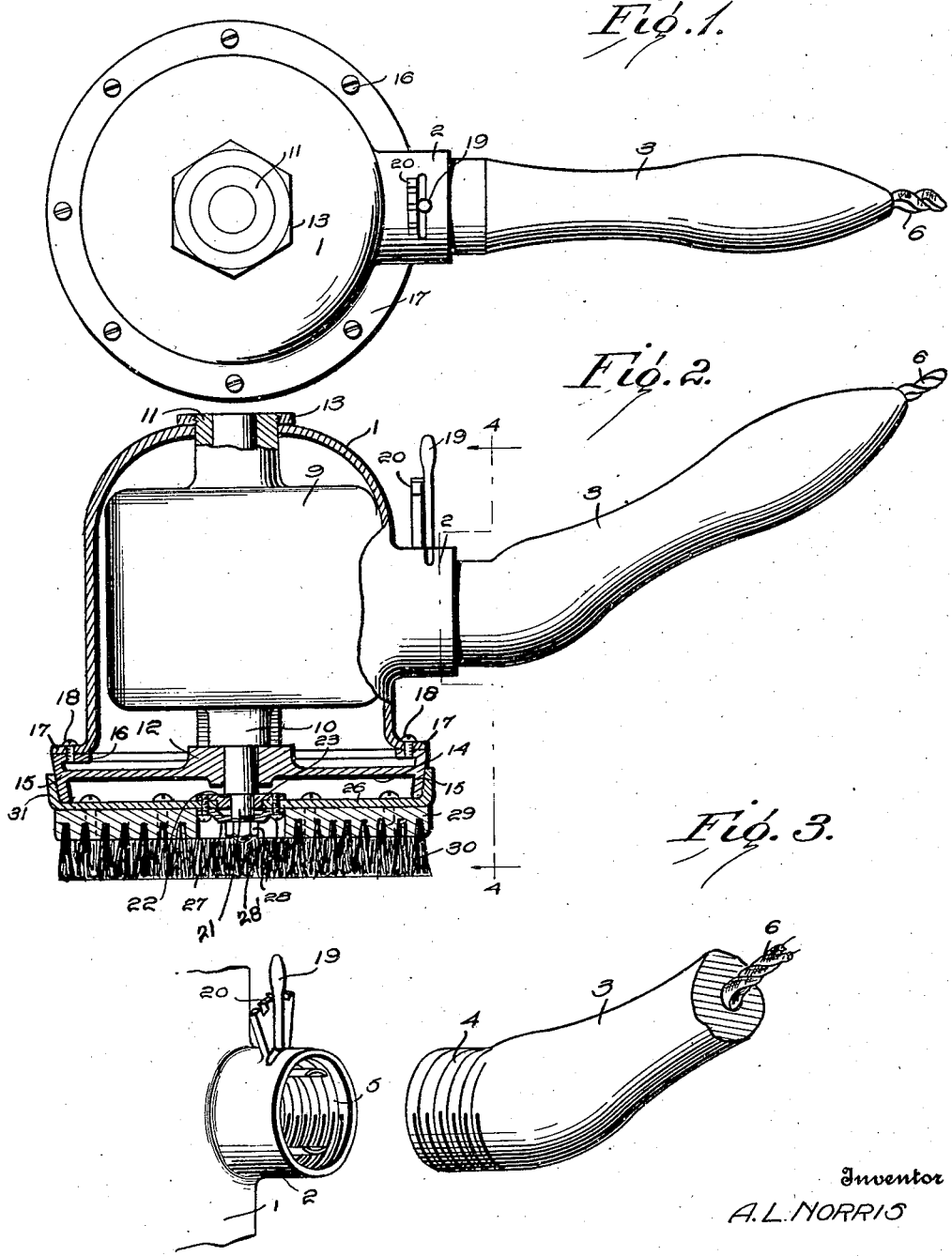

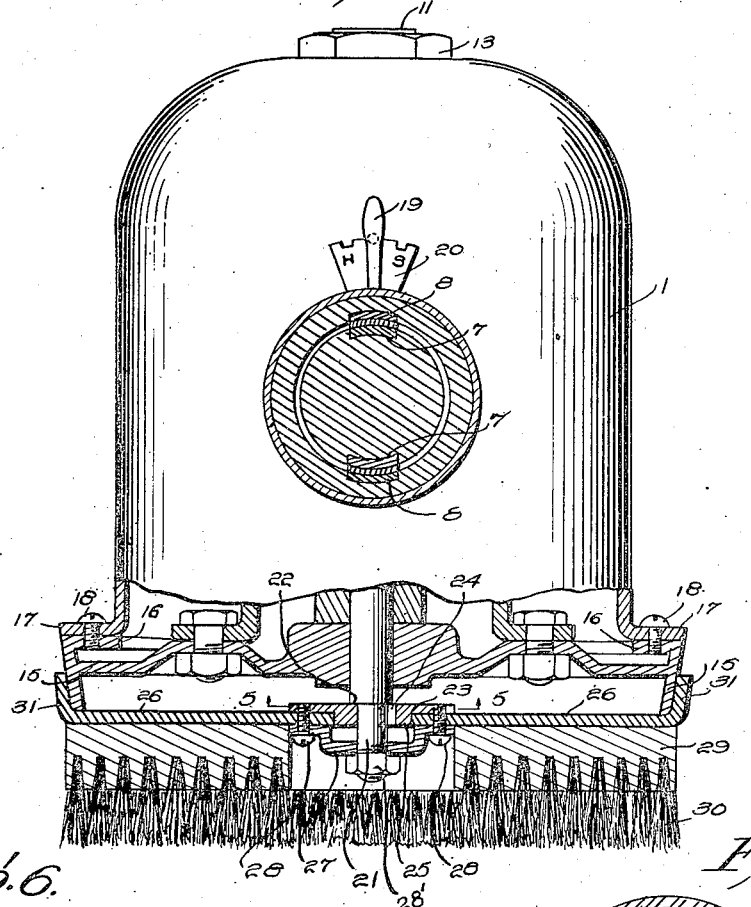
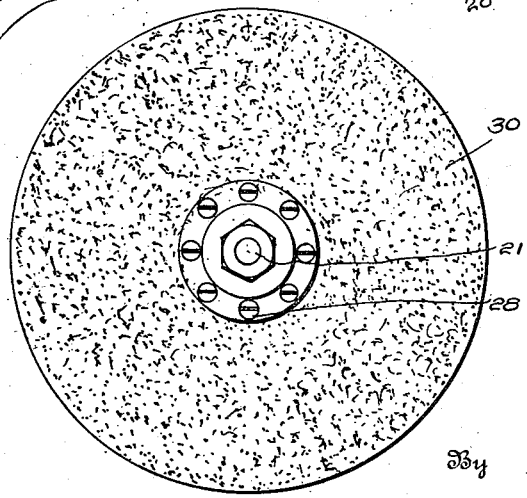
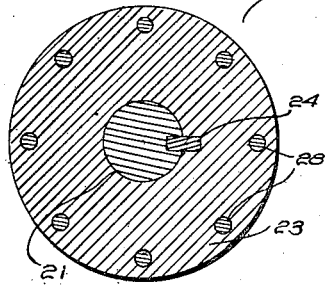

Patented July 3, 1923.

1,460,765

UNITED STATES PATENT OFFICE.

ALBERT L. NORRIS, OF JACKSONVILLE, FLORIDA.

ROTARY BRUSH.

Application filed May 9, 1921. Serial No. 467,988.

*To all whom it may concern:*

Be it known that I, ALBERT L. NORRIS, a citizen of the United States, residing at Jacksonville, in the county of Duval and State of Florida, have invented certain new and useful Improvements in Rotary Brushes, of which the following is a specification.

This invention relates to rotary brushes, and it comprises a casing, a motor arranged in said casing, the main shaft of the motor projecting through the end of the casing, a plate arranged thereon, a brush head mounted on said plate, a cap arranged over said brush head, and retaining means arranged on the end of the shaft.

In the present invention, I have provided a motor driven rotary brush suitable for use in scrubbing clothes or in any other manner wherein a driven brush is desired. The brush is portable, whereby it may be moved over the surface of the cloth or other material being cleaned, and is provided with a handle for the purpose of easy manipulation.

A casing is provided for the reception of the motor whereby the brush is driven and the brush is preferably arranged on the bottom of the casing. The motor shaft extends through the bottom of the casing and the brush is secured thereto.

In the preferred form of the invention, the end of the motor shaft projecting from the casing is reduced to form a shoulder, and a supporting plate is arranged on the reduced end of the shaft for engagement with said shoulder. This plate is provided with an enlarged hub, adapted to be received in an opening in a circular plate forming the brush head. A cap is arranged on the end of the shaft and secured to the retaining plate and brush head by any suitable means.

In the accompanying drawings, I have shown one embodiment of the invention. In this showing:

Figure 1 is a plan view,

Figure 2 is a vertical sectional view of the casing and brush, the handle being shown in elevation, Figure 3 is a detail view of the handle and a portion of the casing.

Figure 4 is a sectional view on line 4—4 of Figure 2, the lower end of the shaft and brush being shown in section, Figure 5 is a detail sectional view on line 5—5 of Figure 4, and, Figure 6 is a detail view of the brush.

Referring to the drawings, the reference numeral 1 designates the casing which may be made of any suitable shape and size and which is provided with a tubular extension 2 for the reception of a handle 3. As shown in Figure 3 of the drawings, the handle is provided with external threads 4 adapted to engage internal threads 5 of the tubular extension for securing the handle in position. Lead wires 6 may be passed through the handle which is preferably made of insulating material and connected to contacts 7 carried by the handle and adapted to engage contacts 8 of the tubular extension when the handle is in position. A motor 9 of any suitable type is arranged within the casing, the motor being provided with a main shaft 10 supported in a bearing 11, at its upper end and a bearing 12 at its lower end. The bearing 11 is formed integral with the motor casing and is provided with a threaded end for the reception of a nut 13. The lower bearing is formed in a bottom plate 14 which is provided with a peripheral flange 15 having an offset portion 16. The bottom end of the casing is provided with a flange 17 arranged adjacent the offset 16, and suitable fastening means 18 are passed through registering openings in the flange and offset to retain the bottom plate in position. A suitable control lever 19 is mounted on the tubular extension whereby the speed of the motor may be varied. As shown, a notched quadrant 20 is arranged adjacent the control lever.

The main shaft of the motor extends beyond the bottom plate of the casing and is provided with a reduced end 21 forming a shoulder 22. A supporting plate 23 is arranged on the end of the main shaft in engagement with the shoulder 22, the plate being keyed to the shaft by means of a key or pin 24, entering notches in the plate and shaft respectively (see Figures 4 and 5). This plate is provided with an enlarged central portion 25 adapted to be received in an opening formed in the base plate 26 of the brush. A cap 27 is arranged under the base plate, and suitable fastening elements 28 are passed through the cap, the base plate and the supporting plate to retain the parts in assembled position. The cap, base plate and supporting plate are retained in position by means of a nut 28', arranged on the end of the shaft.

The base plate of the brush is adapted to carry a block 29 of wood or other suitable material, having bristles 30 mounted therein. The base plate is further provided with a peripheral flange 31 arranged adjacent the flange 15 of the bottom plate of the casing to prevent play during the rotation of the brush.

By means of the construction herein disclosed, a rotary brush is provided in which the parts are connected to each other to permit movement of the brush from place to place either during operation or when the brush is not being used. The means for retaining the brush on the motor shaft permit ready removal of the parts for the purpose of cleaning, replacing and repairing. In use, the brush may travel over the surface of the material being cleaned in a manner similar to the manner in which an iron passes over the surface of goods in pressing.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A rotary brush comprising a supporting plate, a motor mounted thereon, a motor shaft extending below said plate and provided with a reduced end, a supporting plate mounted on the reduced end of said shaft, said supporting plate being provided with an enlarged central portion, a base plate mounted on said supporting plate, said base plate being provided with an enlarged opening for the reception of the enlarged portion of the supporting plate, bristles secured to said base plate, and a cap mounted on the end of said shaft and secured to said base plate and said supporting plate.

2. In a rotary brush, a motor supporting plate, a motor mounted thereon, a motor shaft extending through said plate, said plate being provided with a downwardly extending peripheral flange, a base plate secured to the extending portion of said shaft, said base plate being provided with an upwardly extending peripheral flange engaging the flange of said motor supporting plate, and bristles secured to said base plate.

In testimony whereof I affix my signature in presence of two witnesses.

ALBERT L. NORRIS.

Witnesses:
ALBION W. KNIGHT,
H. B. HODGDEN.